Jan. 12, 1965 I. WUNDERMAN ETAL 3,165,633

ELECTRICAL READOUT DRIVE AND STORAGE CIRCUIT

Filed Aug. 22, 1961

INVENTORS
BLAIR H. HARRISON
IRWIN WUNDERMAN
BY J. C. Chapman
ATTORNEY 3,165,633
ELECTRICAL READOUT DRIVE AND STORAGE CIRCUIT Irwin Wunderman, Mountain View, and Blair H. Harrison, Sunnyvale, Calif., assignors to Hewlett-Packard Company, Palo Alto, Calif., a corporation of California
Filed Aug. 22, 1961, Ser. No. 133,125
10 Claims. (Cl. 250—206)

This invention relates to storage circuits and more particularly to a circuit which is used in an electronic counter to store count information and to control the display readout during successive counting periods.

Electronic counters which have display readouts such as electrically illuminated display numbers generally are designed to count selected events for a predetermined time and to display the count information so obtained for a short observation period. The counter is usually designed to cease functioning during the observation period. At the end of the observation period, the counter is again activated to count the selected events for the same predetermined time. One disadvantage of this system is the time required to establish and display new and successive counts. The observation period may not be reduced below a certain duration without materially increasing the probability of erroneous readings being taken. Thus after a minimum observation period the observer must wait for the new and successive count to be displayed.

It is highly desirable to operate an electronic counter for a predetermined time and to display continually the count information so obtained during the successive counting operation. In this manner, a longer observation period is provided during which the counter continues functioning on a successive counting cycle. More rapid repetition rates may thus be achieved without sacrificing observation time since the counter pauses only long enough to tranfer the count information into a storage circuit which controls the display readout.

Accordingly, it is an object of the present invention to provide an information storage circuit which may be actuated very rapidly to store count information and which is capable of controlling the display readout.

It is another object of the present invention to provide an inexpensive storing circuit which can store indefinitely count information from a previous counting cycle while the counter continues functioning.

Figure 1:
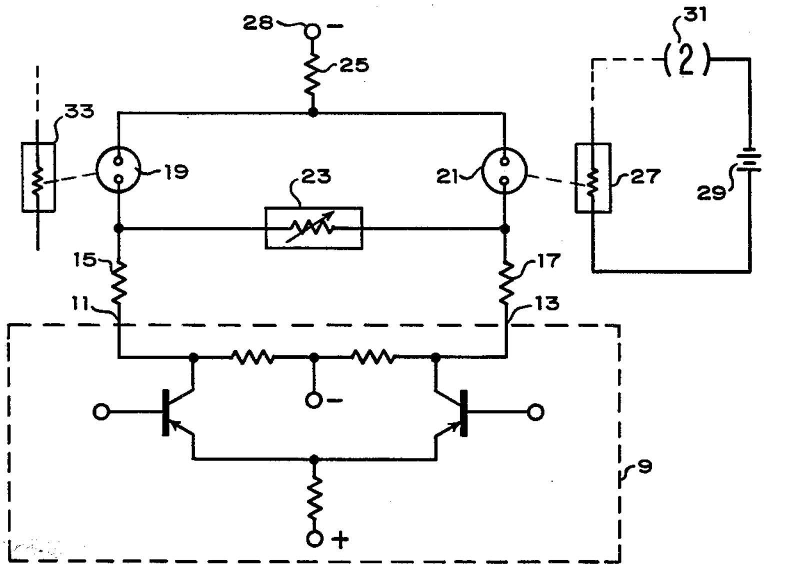
Figure 2:
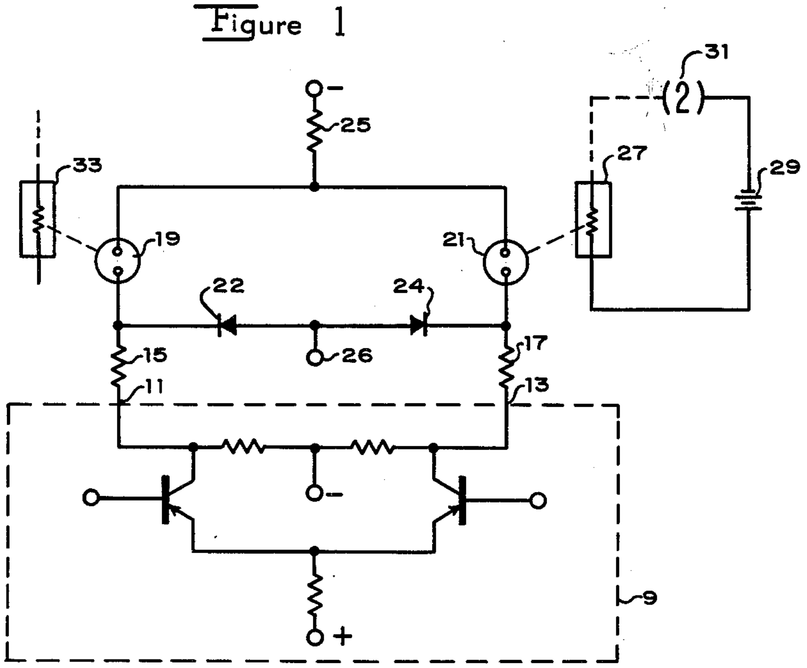

Other and incidental objects of the present invention will be apparent from a reading of this specification and an inspection of the accompanying drawing in which:

FIGURE 1 is a circuit diagram of a preferred embodiment of the present invention, and FIGURE 2 is a schematic diagram of a circuit in accordance with the present invention.

The storage circuit of the present invention is shown connected to a conventional binary circuit 9 in FIGURE 1. The binary circuit 9 has an output line 11 and a complementary output line 13 to which resistors 15 and 17, respectively, are connected. Serially connected neon glow lamps 19 and 21 are connected between the other terminals of resistors 15 and 17. These same resistor terminals are connected together through variable impedance element 23. The common terminal of the serially connected glow lamps is connected to a source of potential through resistor 25. Photoconductive element 27 is disposed to receive illumination from glow tube 21. This and other similarly disposed photoconductive elements constitute a portion of a photoconductive matrix which, in conjunction with voltage supply 29, controls the readout display device 31. Photoconductive element 33 is similarly disposed to receive illumination from neon glow tube 19. The circuit shown in FIGURE 2 is substantially the same as the circuit of FIGURE 1 with the exception that the variable impedance element 23 of FIGURE 1 is replaced by diodes 22 and 24.

Binary 9 represents one logic block in the counting circuit of an electronic counter. This binary circuit operates only in either one of the two operating states. Thus in the on-state, an output signal of high amplitude may appear on line 11 and a complementary signal of low amplitude may appear on line 13. If binary 9 is in the off-state, the amplitudes of signals appearing at output lines 11 and 13 are reversed. Assuming that binary circuit 9 is operating in the off-state, then the signal on line 13 is of high amplitude. Neon glow lamp 21, which requires a higher ignition potential than a sustaining potential, may thus be fired by the voltages appearing at terminal 28 and on line 13. Photoconductive element 27 receives light from neon glow lamp 21 and is made highly conductive. Display device 31 may be an electrically actuated glow lamp, called a Nixie tube which is connected to be actuated by voltage supply 29 when the other photoconductive cells of a photoconductor matrix which are associated with display device 31 are also made highly conductive.

The current through glow tube 21 and through resistor 25 causes the potential across glow tube 19 to drop much below the value required for ignition. The variable impedance element 23, which is normally of very high impedance, is made very low in impedance value in response to some external excitation. Impedance element 23 may be a photoresponsive element which is energized either by an external light source or by either of neon lamps 19 and 21. The element 23 may also be a transistor normally biased to cutoff which is made highly conductive in response to applied signals. When the impedance of element 23 is made small, the neon glow lamps 19 and 21 are connected in parallel, i.e., the voltage across glow lamp 19 is substantially the sustaining voltage of glow lamp 21. Thus glow lamp 19 is not able to ignite and the impedances connected to lines 11 and 13 are substantially equal. Binary circuit 9 is therefore free to function in a successive counting cycle, during which time the information of the previous count is stored by the ionized glow lamp 21 and is displayed by display device 31.

The preferred embodiment of the storage circuit of the present invention is shown in FIGURE 2. This circuit operates from the output lines of binary circuit 9 in substantially the same manner as previously described in connection with the circuit of FIGURE 1. However, immediately following the ionization of either glow lamp 19 or glow lamp 21, a storage signal is applied to the common terminal 26 of the serially connected diodes 22 and 24. The normally back-biased diodes are thereby made conductive, clamping the end terminals of the glow lamps 19 and 21 to the voltage of the storage signal appearing at terminal 26. The potential across the de-ionized glow lamp is thereby maintained at the sustaining voltage of the ionized glow lamp. Only one lamp may be held ionized for each of the particular operating states of binary circuit 9. When the diodes 22 and 24 become forward biased by the application of the storage signal at terminal 26, the impedances seen by the output lines 11 and 13 are substantially equal. This is because the common terminal and the end terminals of the serially connected diodes 22 and 24 are all connected together to form a single junction when the diodes are rendered conductive. The impedance seen at each output line is thus equal to the resistor 15 or 17 connected thereto plus the impedance seen at this single junction. With equal loads on the output lines 11 and 13 the binary circuit 9 is again free to function in a successive counting cycle.

Therefore, the circuit of the present invention uses inexpensive components to not only store the count information following a counting cycle, but also to control the display readout device during the successive counting cycle. The storage of count information from a previous cycle is readily destroyed at the termination of the successive counting cycle by the removal of the excitation which clamps the end terminals of the neon glow lamps together. Entry of new count information into the instant storage circuit is effected when the variable impedance element shows high impedance in the absence of excitation. This storage circuit thus permits the rapid storage of information following a count, and the rapid destruction of the stored information at the termination of a successive counting cycle. An electronic counter using the storage circuits of the present invention is thus required to pause only momentarily to transfer the count information into storage before repeating the counting cycle. This permits high count repetition rates and long-term observation periods.

We claim:

1. An output circuit for apparatus which performs logic operations comprising a plurality of binary circuits that produce relatively high and low amplitude output signals on pairs of output lines in opposite phase relationship, a storage circuit for each of said binary circuits comprising voltage responsive lamps connected to each of said output lines, said lamps having a first voltage above which they become luminant and a second voltage level below which they become extinguished, the first voltage level being higher than the second voltage level, a voltage source connected to said lamps for making luminant the lamp which receives an output signal of relatively low amplitude from said binary circuit and for sustaining the voltage across the luminant lamp above the second voltage level and below the first voltage level, and switching means connected between the common connection of said output lines and said lamps, said switching means becoming conductive in response to a signal applied thereto to clamp the voltage across the non-luminant lamp to the voltage across the luminant lamp.

2. An output circuit for apparatus which performs logic operations comprising a plurality of binary circuits that produce output and complementary output signals on pairs of output lines in opposite phase relationship, a storage circuit for each of said binary circuits comprising two voltage responsive lamps serially connected between said output lines, each of said lamps having a first voltage level above which it becomes luminant and a second voltage level below which it becomes extinguished, the first voltage level being higher than the second voltage level, a voltage source, a resistor connecting the common terminal of said lamps to the voltage source for making luminant only the lamp which receives a selected one of said output signals from the binary circuit, the voltage from said voltage source having sufficient amplitude to sustain the voltage across the luminant lamp above the second voltage level and below the first voltage level, and switching means connected between the other terminals of said lamps, said switching means becoming effective in response to a signal applied thereto to clamp the voltage across the non-luminant lamp to the voltage across the luminant lamp.

3. An output circuit for apparatus which performs logic operations comprising a plurality of binary circuits that produce output and complementary output signals on pairs of output lines in opposite phase relationship, a storage circuit for each of said binary circuits comprising a pair of serially connected voltage responsive lamps, first and second resistors connecting the end terminals of said lamps and each of the output lines, said lamps having a first voltage level above which they become luminant and a second voltage level below which they become extinguished, the first voltage level being higher than the second voltage level, a voltage source, a third resistor connecting the common terminal of said lamps and the voltage source for rendering luminant only the lamp which receives a selected one of said output signals from the binary circuit, the voltage from said voltage source having sufficient amplitude to sustain the voltage across the luminant lamp above the second voltage level and below the first voltage level, and a first photoresponsive element connected between said end terminals of the lamps and disposed to receive illumination from an external light source, said first photoresponsive element becoming highly conductive in the presence of illumination from said light source to clamp the voltage across the non-luminant lamp to the voltage across the luminant lamp.

4. An output circuit for apparatus which performs logic operations comprising a plurality of binary circuits that produce output and complementary output signals on pairs of output lines in opposite phase relationship, a storage circuit for each of said binary circuits comprising a pair of serially connected voltage responsive lamps, first and second resistors connecting each of the end terminals of said serially-connected lamps and an output line, said lamps having a first voltage level above whih they become luminant and a second voltage level below which they become extinguished, the first voltage level being higher than the second voltage level, a voltage source, a third resistor connecting the common terminal of said lamps and the voltage source for rendering luminant only the lamp which receive a selected one of said output signals from the binary circuit, the voltage from said voltage source having sufficient amplitude to sustain the voltage across the luminant lamp above the second voltage level and below the first voltage level, a pair of unidirectional conduction elements serially connected between said end terminals of the lamps, said unidirectional conduction elements being connected to be normally reverse biased, and a source of storage signal connected to the common terminal of the unidirectional conduction elements, said elements becoming forward biased in response to said storage signal to clamp the voltage across the non-luminant lamp to the voltage across the luminant lamp.

5. An output circuit for apparatus which performs logic operations comprising a plurality of binary circuits that produce output and complementary output signals, a storage circuit for each of said binary circuits comprising a plurality of voltage responsive elements, each having a pair of terminals and having a first voltage above which it is rendered operative and a second voltage below which it is rendered inoperative, impedance means connecting one terminal of one of said elements to receive one of said output signals, impedance means connecting one terminal of another of said elements to receive the other of said output signals, a conductive connection between the other terminals of said one and said other elements, a voltage source, impedance means connecting said voltage source to said conductive connection at a point thereon intermediate said other terminals of the elements for applying to said elements a voltage of sufficient amplitude to render and maintain operative the element which receives a selected one of said output signals from the binary circuit, switching means having high and low conductivity states in response to an applied signal, means connecting said switching means between said one terminal of said elements, said switching means becoming effective in response to an applied signal to clamp the voltage across the inoperative element to the voltage across the operative element.

6. A storage circuit comprising a first logic circuit having a plurality of inputs and a plurality of operating states, a second logic circuit having at least the number of operating states of said first logic circuit and having a plurality of outputs, means connecting the inputs of the first logic circuit and the outputs of the second logic circuit, the first logic circuit being adapted to change operating states for each change in the operating states of said second logic circuit, and switching means connected to the inputs of said first logic circuit, said switching means being rendered effective in response to a signal applied thereto to connect together the inputs of said first logic circuit for maintaining the first logic circuit in one operating state during the application of said signal to said switching means independent of changes in the operating states of the second logic circuit.

7. A storage circuit comprising a first binary having a pair of inputs and a second binary having a pair of outputs, each of said binaries being adapted to operate only in either one of two operating states, means connecting the inputs of the first binary to the outputs of the second binary, the first binary being adapted to change operating states for each change in the operating states of said second binary, and circuit means having low conductivity and high conductivity operating states and being connected to the inputs of said first binary, said circuit means being rendered highly conductive in response to a signal applied thereto to connect together the inputs of said first binary for maintaining the first binary in one operating state during the application of said signal to said circuit means independent of changes in the operating states of the second binary.

8. A storage circuit comprising a first binary circuit having a pair of inputs and being adapted to operate only in either one of two operating states, a second binary circuit having a pair of outputs and being adapted to operate only in either one of two operating states, said second binary circuit producing signals on said outputs which have relatively low and high amplitudes for one operating state and which have relatively high and low amplitudes for the other operating state, conductive means connecting the inputs of the first binary circuit and the outputs of the second binary circuit, the first binary circuit being adapted to change operating states for each change in the operating states of said second binary circuit, circuit means having high and low conductivity operating states and being connected to the inputs of said first binary circuit, said circuit means being rendered highly conductive in response to a signal applied thereto to connect together the inputs of said first binary circuit for maintaining the first binary circuit in one operating state during the application of said signal to said circuit means independent of changes in the operating states of the second binary circuit.

9. An output circuit for apparatus which performs logic operations comprising a binary circuit that produces a plurality of output signals of dissimilar amplitudes; a storage circuit for said binary circuit comprising a plurality of voltage responsive lamps, each having one terminal connected to receive an output signal produced by the binary circuit, each of said lamps having a first voltage level above which it becomes luminant and a second voltage level below which it becomes extinguished, the first voltage level being higher than the second voltage level, a voltage source connected to another terminal of said lamps for making luminant the lamp which receives a selected one of said output signals from the binary circuit and for sustaining the voltage across the luminant lamp above the second voltage level and below the first voltage level, and variable impedance means which increases conductivity in response to a control signal applied thereto connected between said one terminals of the lamps to clamp the voltage across the non-luminant lamp to the voltage across the luminant lamp when control signal is applied to said variable impedance means.

10. An output circuit for apparatus which performs logic operations comprising a driver logic circuit having a plurality of outputs and at least two operating states identified by signals of selected amplitudes on said outputs, a follower logic circuit having a plurality of terminals and an input for receiving a storage control signal and having at least two operating states, said follower logic circuit being actuatable during the appearance of a storage control signal of selected level at said input to change operating states in response to a signal of selected amplitude applied to one terminal of said follower logic circuit, a bias supply connected to another terminal of said follower logic circuit for maintaining said follower logic circuit operative in one operating state after appearance of a storage control signal at said input, means connecting an output of said driver logic circuit to said one terminal of said follower logic circuit, said follower logic circuit being rendered operative in response to a storage control signal of said selected level applied to said input to operate in an operating state related to the signal of selected amplitude applied to said one terminal from an output of the driver logic circuit, a visual indicating device, and means coupled to said device and to said follower logic circuit and responsive to the operating state thereof for actuating said device to produce a visual indication of the operating state of the follower logic circuit.

References Cited by the Examiner

UNITED STATES PATENTS

| | | | |
|---|---|---|---|
| 2,367,522 | 1/45 | Pfleger | 179—90 |
| 2,614,140 | 10/52 | Kreer | 307—88.5 |
| 2,964,680 | 12/60 | Irving | 315—166 |
| 3,003,096 | 10/61 | Du Bois. | |
| 3,040,178 | 6/62 | Lyman et al. | 250—213 |
| 3,042,813 | 7/62 | Johnson. | |
| 3,107,301 | 10/63 | Willard | 250—209 |

RALPH G. NILSON, *Primary Examiner.*

WALTER STOLWEIN, *Examiner.*